(12) United States Patent
Grisley et al.

(10) Patent No.: US 6,736,173 B1
(45) Date of Patent: May 18, 2004

(54) ADJUSTABLE GUIDEBUSHING AND INLAY TECHNIQUES

(75) Inventors: Kenneth M. Grisley, Port Coquitlam (CA); Jeffrey Greenup, Kelowna (CA)

(73) Assignee: Leigh Industries, Ltd., Port Coquitlam (CA)

( * ) Notice: Subject to any disclaimer, the term of this patent is extended or adjusted under 35 U.S.C. 154(b) by 0 days.

(21) Appl. No.: 10/208,354

(22) Filed: Jul. 29, 2002

(51) Int. Cl.[7] .................................................. B27C 5/00
(52) U.S. Cl. .............................. 144/145.3; 144/136.95; 144/144.1
(58) Field of Search .......................... 144/145.3, 145.2, 144/144.1, 136.45, 144.51, 144.52, 145.1; 403/299, 300, 301, 341, 373, 374.2, 374.3; 409/130, 110

(56) References Cited

U.S. PATENT DOCUMENTS

| | | | | |
|---|---|---|---|---|
| 3,860,050 A | * | 1/1975 | Banks | 144/144.51 |
| 4,089,755 A | * | 5/1978 | Steinecker | 205/312 |
| 4,640,324 A | * | 2/1987 | Lounds | 144/154.5 |
| 5,114,265 A | * | 5/1992 | Grisley | 403/381 |
| 5,146,965 A | * | 9/1992 | Gibson | 144/372 |
| 5,228,489 A | * | 7/1993 | Werber et al. | 144/218 |
| 5,289,861 A | * | 3/1994 | Hedrick | 144/135.2 |
| 5,318,082 A | * | 6/1994 | Von Hollen | 144/84 |
| 5,366,315 A | * | 11/1994 | Hartley | 403/326 |
| 5,423,357 A | * | 6/1995 | Szymanski | 144/144.52 |
| 5,584,328 A | * | 12/1996 | Grisley | |
| 5,697,413 A | * | 12/1997 | Fuller | 144/356 |
| 5,769,487 A | * | 6/1998 | Michler | 279/2.08 |

OTHER PUBLICATIONS

Lee Valley Tools Ltd. and Veritas Tools Ltd. website Woodworking Router Assesories, 1–3/16" Brass Template Guides http://www.leevaley.com.*
Leigh Industries, Ltd. The Variable Guidebush System (VGS), Leigh I1 User Guide, Sep. 99, Chapter 4, pp. 19–23.
Lee Valley Tools Ltd. and Veritas Tools Ltd. website catalog, Oct. 2002. Woodworking Router Assessories, Inlay Set. #04J28.05 and Inlay Bushing & Key #04J28.01. http://www.leevalley.com.
Lee Valley Tools Ltd. and Veritas Tools Ltd. website instructions, Oct. 2002, Inlay Bushing Set #04J28.05 and Inlay Bushing & Key #04J28.01. http://www.leevalley.com.
Woodworker's Supply, Inc. website catalog (Jan. 2002). Oversize Inlay Guide Bushings Catalog #934–897, #935–135, #935–100, #935–107, #935–121, #935–128. http:/woodworker.com.

* cited by examiner

*Primary Examiner*—Allen Ostrager
*Assistant Examiner*—Shelley Self
(74) *Attorney, Agent, or Firm*—Kilpatrick Stockton LLP; John S. Pratt; Geoffrey K. Gavin

(57) ABSTRACT

A guidebushing assembly for use with an electric router. A guidebushing holder clamps to the router base, and a guidebushing is secured within the holder and used for cutting an inlay by reference to a female pattern. An appropriately shaped and sized recess is cut by reference to the female template while contacting the template with a tapered sleeve secured to the guidebushing. Movement of the guidebushing and sleeve along the axis of rotation of the router cutter permits adjustment in the size of the recess cut by reference to the template.

20 Claims, 5 Drawing Sheets

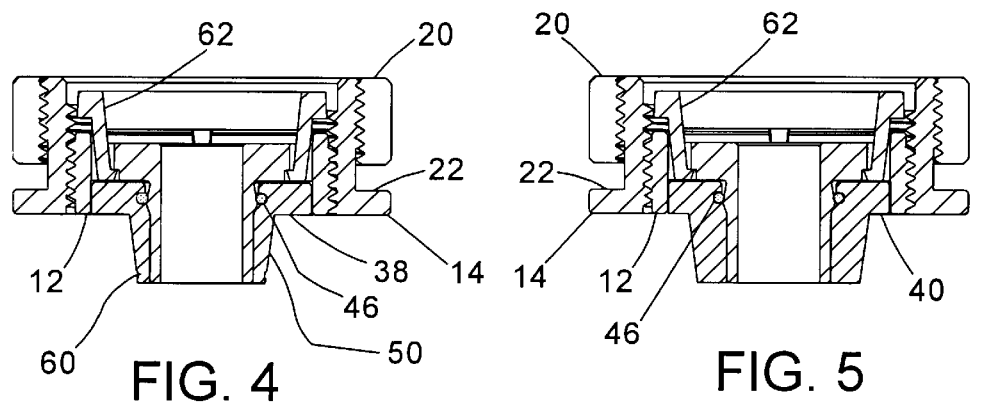
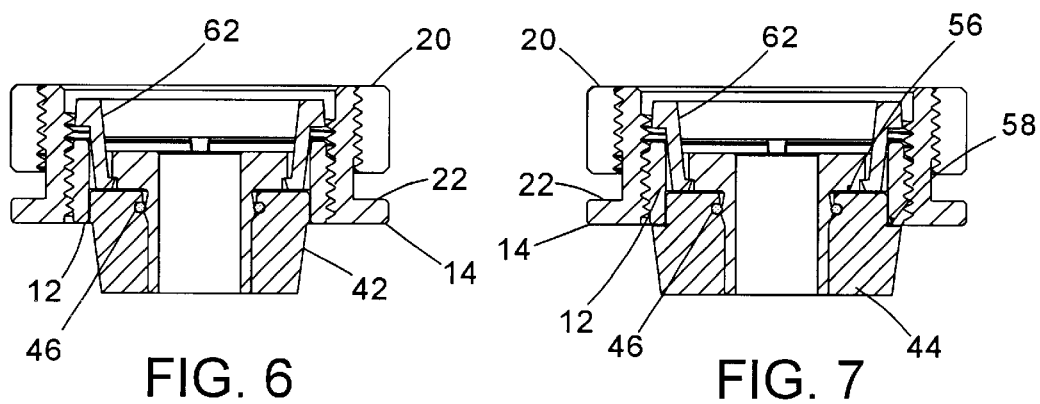

ADJUSTABLE GUIDEBUSHING AND INLAY TECHNIQUES

FIELD TO THE INVENTION

This invention relates to electric routers and guidebushings utilized with such routers in order to form wood veneer or other inlays and recesses for such inlays.

BACKGROUND OF THE INVENTION

Guidebushings and sleeves are used with electric routers to form inlays of wood veneer or other routable materials like Corian® and other brands of solid surface countertop materials and to form recesses in workpieces within which such inlays are positioned. Generally, such conventional guidebushings and sleeves are sized to provide an appropriate off-set for a specific routing cutter, such as a ¹⁄₁₆", ⅛" or ¼" diameter cutter. Sleeves are also available for use with larger cutters. Such conventional guidebushings and sleeves are used, for instance, by forming an inlay by using a particular cutter and a bushing in contact with a female template. Then the same template can be used with a sleeve larger in diameter than the guidebushing by an amount twice the diameter of the cutter. This offsets the position of the cutter relative to the same female pattern by the diameter of the cutter so that the recess will be equal in size to the inlay.

However, if the cutter is oversize, the recess will be oversize and the inlay will be undersize, with a poor fit as a result. If the router cutter cuts undersize, the opposite is true. The recess will then be too small and the inlay will be too large.

There is, therefore, a need for apparatus and techniques that can accommodate variations in cutter size and allow adjustment of the relative size of the inlay and recess within which it fits to permit control of the fit.

SUMMARY OF THE INVENTION

This invention provides components and techniques permitting adjustment of the relative size of an inlay and a recess for that inlay cut with an electric router. This permits accommodation of variations in cutter size and greater control of the inlay and recess cutting processes.

A guidebush holder is secured to a router base at least reasonably concentric with the router collet. A guidebushing is secured in the holder in a manner permitting the position of the guidebushing to be adjustable along the axis of rotation of the collet. For instance, the holder maybe internally threaded to receive an externally threaded guidebushing that engages the holder internal thread and is selectively positionable along the axis of the router collet by rotation and consequent travel of the guidebush along the threaded inside of the holder. The guidebush has a protruding cylindrical bushing concentric with the router collet and through which a router cutter protrudes during use. Router position is controlled during formation of an inlay by contact between the outer wall of the guidebushing and a female template.

A guidebush sleeve having an appropriate nominal diameter is then slid over the cylindrical guidebushing and secured in place on that bushing by cooperation between an O-ring positioned in an internal annular groove in the sleeve and a recess in the upper portion of the guidebushing wall or other wall structure suitable for capturing the O-ring. The guidebushing sleeve is externally tapered so that the effective diameter of the guidebushing sleeve in contact with a template is a function, in part, of the position of the sleeve along the axis of the router collet, which position is adjustable by screwing the guidebush into or out of the holder. The smaller diameter portion of the sleeve is the portion most distant from the router collet. The nominal diameter of the guidebushing sleeve should be greater than the guidebushing diameter by twice the diameter of the cutter being used.

By taking a first cut to form a recess within which an inlay is to be positioned with the guidebushing positioned within the holder lower in the router assembly (and thereby further from the router collet), a relatively larger diameter portion of the sleeve will contact the template, resulting in a relatively smaller recess. Adjustment in the size of the recess may be accomplished by moving the guidebushing further into the holder (and thereby nearer the router collet) to cause a relatively smaller diameter portion of the sleeve to contact the template. In a threaded holder and guidebushing configuration this is accomplished by screwing the guidebushing into the holder. Successive cuts are made following such adjustments until the needed size recess is obtained.

A resilient plug of nylon or other suitable material within the guidebushing engages the holder to create friction between the guidebushing and holder to permit smooth turning of the guidebushing during its adjustment while eliminating the risk of unintended rotation of the guidebushing during use of the apparatus.

Structure may also be provided to facilitate removal of sleeves from the guidebushing. For instance, an annual groove can be formed in the sleeve near its end to facilitate grasping the sleeve. Alternatively an ejector structure can be provided, such as an ejector ring with legs that pass through the guidebushing in order to contact the top side of the sleeve. Such an ejector ring can be used by pressing down on the ring in order to force the legs to in turn force the sleeve down on and off of the guidebushing.

BRIEF DESCRIPTION OF THE DRAWINGS

FIG. 4 is an assembled side view, in section, of the guidebushing and guidebushing holder of this invention shown in FIGS. 1, 2 and 3.

FIG. 5 is an assembled side view, in section, of the guide bushing and guidebushing holder of this invention with a sleeve larger in diameter than the sleeve of FIGS. 1, 2, 3 and 4.

FIG. 6 is an assembled side view, in section, of the guide bushing and guidebushing holder of this invention with a sleeve larger in diameter than the sleeve of FIG. 5.

FIG. 7 is an assembled side view, in section, of the guide bushing and guidebushing holder of this invention with a sleeve larger in diameter than the sleeve of FIG. 6.

DETAILED DESCRIPTION OF THE DRAWINGS

Figure 1:
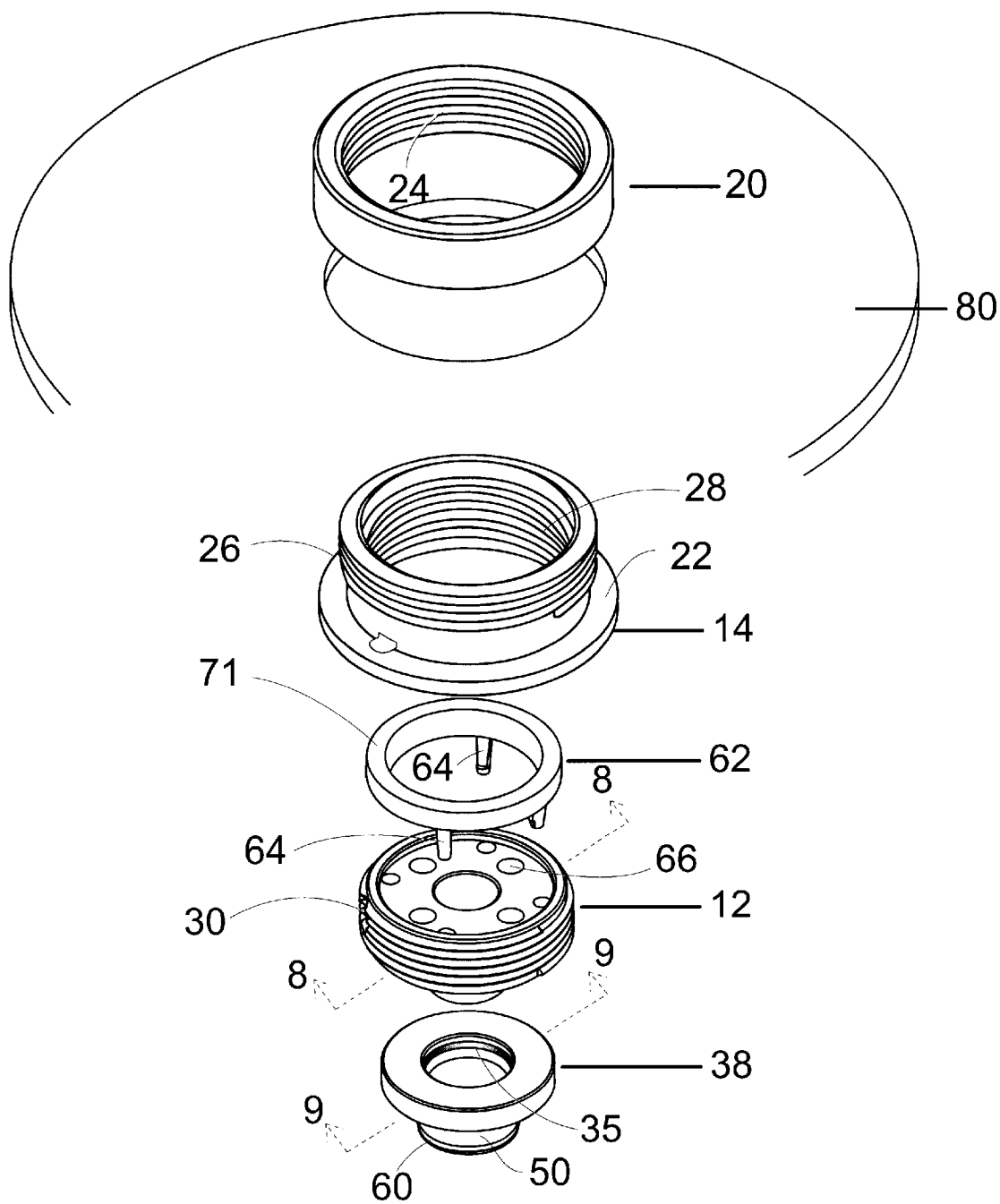
FIG. 1 is an exploded isometric view, taken from above, of one embodiment of a guidebushing and guidebushing holder of this invention, together with a sleeve of relatively small diameter, and a router base.

As may be appreciated by reference to the figures, the guidebushing assembly of this invention comprises generally a guidebushing 12 positioned within a guidebushing holder 14 that is clamped within a router base 80 by trapping a portion of the router base 80 between an internally threaded locking ring or nut 20 and a flange 22 on holder 14. Internal threads 24 in locking ring 20 engage external threads 26 on holder 14. Holder 14 also carries internal threads 28 that engage external threads 30 of guidebushing 12, permitting guidebushing 12 to be held within holder 14 at different locations along the axis of rotation 34 of the router collet (not shown).

In the embodiment of this invention depicted in the figures, the position of guidebushing 12 along axis 34 during use of the guidebushing 12 without a sleeve 38, 40, 42 or 44 does not matter since the contact wall 36 of guidebushing 12 is cylindrical.

Figure 8:
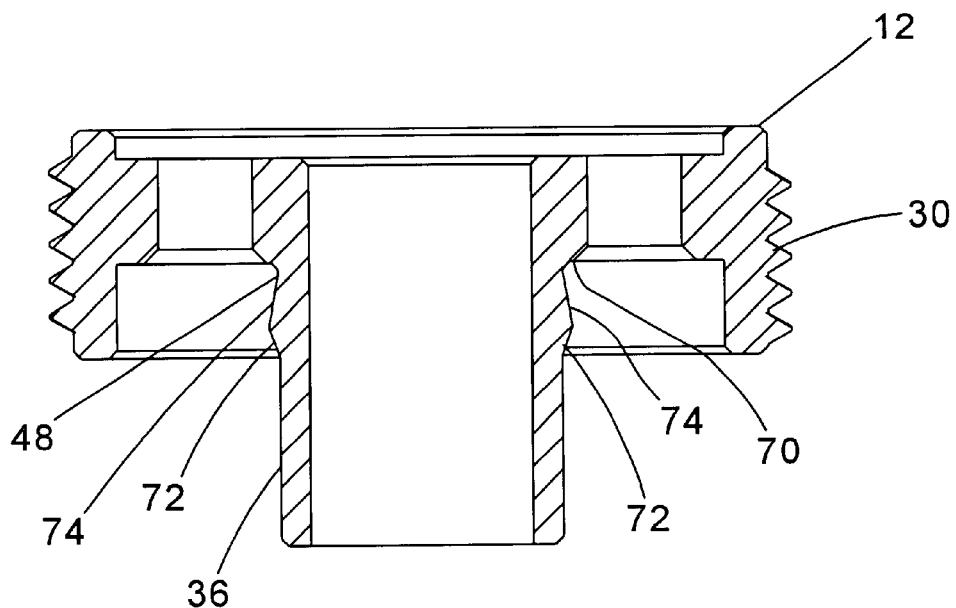
FIG. 8 is a cross-sectional view of the guidebushing of FIG. 1 as viewed along cross-section lines 8—8 of FIG. 1.

After the router and guidebushing 12 and bushing holder 14 assembly are utilized, for instance, to form an inlay using a female pattern, a tapered guidebushing sleeve, such as guidebushing sleeve 38, is positioned around external wall 36 of guidebushing 12. The sleeve 38 may be retained in this position by any appropriate structure such as an internal thread on the sleeve engaging an external thread on the guidebushing. In the illustrated embodiment the sleeve 38, 40, 42 or 44 is slipped onto the guidebushing wall 36 until a resilient O-ring 46 (made, for instance, of neoprene or rubber and seated in annular recess 35 of sleeve 38, 40, 42, or 44) is received in a recess 48 in guidebushing 12. As may be appreciated by reference to FIG. 8, recess 48 may be formed by sloping a portion 72 of the guidebushing wall 36 outward and a second portion 74 inward, or by other means such as forming an annular groove in the same location in guidebushing 12. Formation of an enlarged portion of the guidebushing 12 defined by portions 72 and 74, as shown in FIG. 8, can provide two functions. First, it provides a recess 48 or detent for the O-ring 46 to seat in. Second, it provides a tapered male surface 72 to mate with the angled surface 76 in each sleeve 38, 40, 42 and 44.

Figure 9:
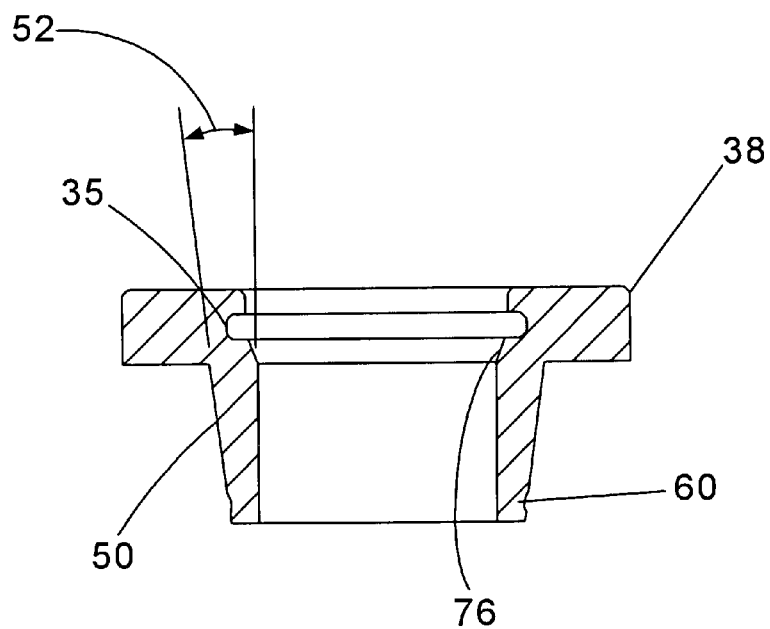
FIG. 9 is a cross-sectional view of the guidebushing holder of FIG. 1 as viewed along cross-section lines 9—9 of FIG. 1.

The external wall 50 of sleeve 38 is tapered so that the shape of surface 50 is that of a truncated right conical section. The taper angle 52 shown in FIG. 9 may be a wide variety of different angles, but an angle of approximately seven and one-half five degrees (7.5°) has been determined to work well. The nominal external diameter of the sleeve 38 utilized in connection with a router cutter of a particular diameter should be greater in diameter than the cylindrical surface 36 of guidebushing 12 by twice the diameter of the router cutter. As used herein, the term "nominal diameter" generally means the diameter of a tapered sleeve 38, 40, 42 or 44 measured at approximately its mid point in usable adjustment range.

After positioning the sleeve 38 on guidebushing 12, a recess is formed in the workpiece within which the inlay is to be positioned by manipulating the router with the face 50 of sleeve 38 in contact with the female template. Complete formation of the inlay recess is accomplished by routing away the entire area within the female template, first with contact with the template and then free hand to clean out the rest of the area of the recess. In order to ensure a good fit between the inlay and the recess, the recess can initially be cut slightly undersized and then enlarged until a good fit is achieved. This may be accomplished by cutting the recess first with guidebushing 12 positioned low in the holder 14 (i.e., at a maximum distance from the router collet or projection from the base 16).

Such a low position will cause a relatively larger diameter portion of surface 50 of sleeve 38 to contact the template and thereby result in a relatively smaller recess. Bushing 12 can then be rotated within holder 14 to cause it to move upward as depicted in FIG. 1 (and therefore closer to router collet) and the recess routed again. This will cause a relatively smaller diameter of surface 50 of sleeve 38 to contact the template and thereby enlarge the recess cut by the router cutter.

There are competing considerations in choosing cutter diameter for forming inlays and recesses to receive such inlays in accordance with this invention. Sharp internal corners cannot be made. Inside corners must have a radius at least as large as the radius of the cutter being used. This consideration makes it desirable to use smaller diameter cutters if the design has corners in order to produce a smaller radius at the corners. It is desirable, however, to use larger diameter cutters where there are substantial quantities of material to be removed, particularly if the design does not have internal corners or does not require that there be a small radius on internal corners.

Thus, it is desirable to be able to utilize this invention with different diameters of cutters. In order to accommodate different cutter diameters, sleeves can be provided with different nominal diameters. For instance, cylindrical contact wall 36 of guidebushing 12 might have a diameter of $\frac{3}{8}$ of an inch. Sleeve 38 may then have a nominal diameter of $\frac{1}{2}$ inch, making it usable with a router cutter having a $\frac{1}{16}$ inch diameter. Sleeve 40 might have a nominal diameter of $\frac{5}{8}$ of an inch, making it usable with a cutter having a diameter of $\frac{1}{8}$ of an inch. Sleeve 42 might have a nominal diameter of $\frac{3}{4}$ths of an inch, making it usable with a cutter having a diameter of $\frac{3}{16}$ of an inch. Finally, sleeve 44 may have a nominal diameter of $\frac{7}{8}$ inch, making it usable with a cutter $\frac{1}{4}$ of an inch in diameter.

The diameters of contact wall 36 of guidebushing 12 and of the sleeves 38, 40, 42 and 44 and router cutters with which they are used, can of course, be other appropriate dimensions, including metric dimensions. It is simply necessary that the nominal diameter of a sleeve be equal to the diameter of contact wall 36 plus twice the diameter of the router cutter with which the sleeve is used.

Figure 2:
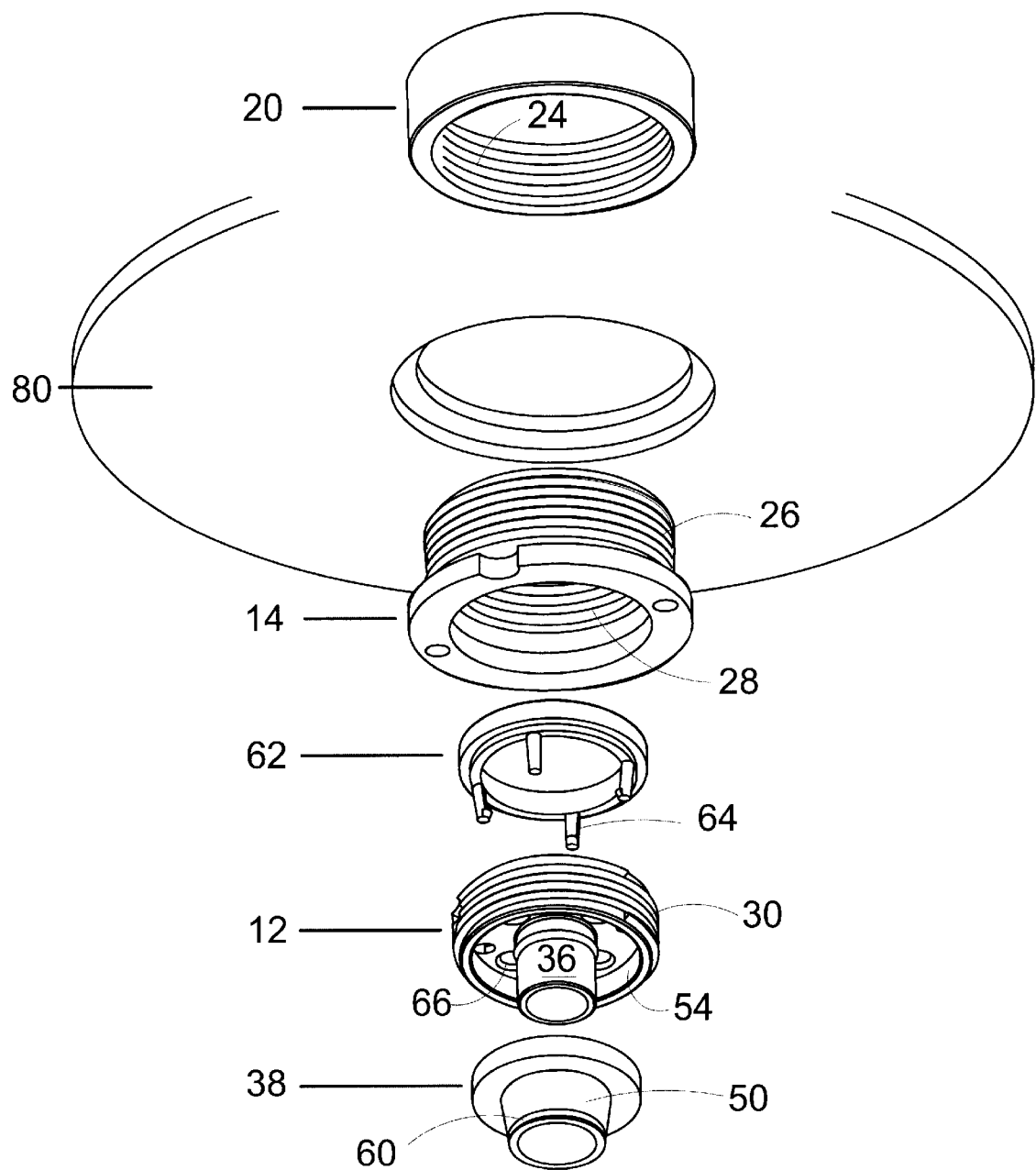
FIG. 2 an exploded isometric view, taken from below, of the embodiment of a guidebushing and guidebushing holder of this invention shown in FIG. 1 and a router base.
Figure 3:
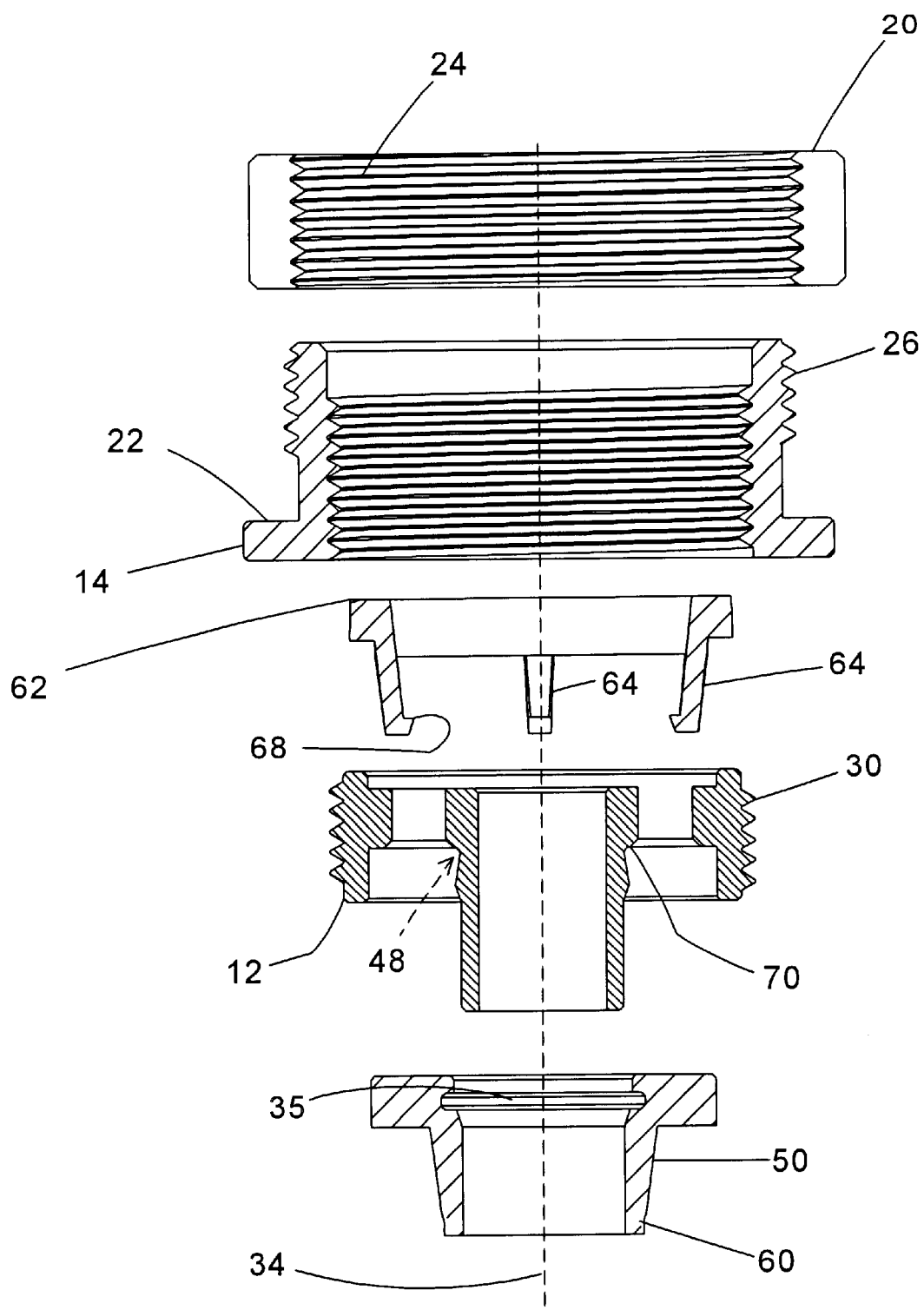
FIG. 3 is an exploded side view, in section through its longitudinal axis, of the embodiment of the guidebushing and guidebushing holder of this invention shown in FIGS. 1 and 2.

As may be seen by reference to FIG. 7, the top portion 56 of sleeve 44 needs to be reduced in diameter relative to the face 58 of sleeve 44 so that the top portion 56 of sleeve 44 may be received within the recess 54 (see FIG. 2) when sleeve 44 is positioned on guidebushing 12.

A small groove 60 may be formed near the lower end 61 of each sleeve 38, 40, 42 and 44 to facilitate sleeve removal by providing a seat for a user's fingernails during grasping and removal of the sleeve.

An alternative structure to facilitate removal of each sleeve 38, 40, 42 or 44 may be provided. For instance, an ejector ring 62 may be used having multiple legs 64 that protrude through holes 66 in guidebushing 12. A protrusion 68 on each leg 64 seats against an undercut portion 70 of guidebushing 12 adjacent to each hole 66. This insures that ejector ring 62 will be retained within guidebushing 12 unless sufficiently intentional action is taken to remove it. However, finger pressure on the top 71 of ejector ring 62 will press legs 64 against a sleeve 38, 40, 42 or 44, causing O-ring 46 to disengage from recess 48 and the sleeve to slip at least part way off of guidebushing 12. Ejector ring 62 may be molded or otherwise formed of nylon or other suitable plastic materials.

The foregoing description and the accompanying drawings are provided for the purpose of illustrating, explaining and describing embodiments of this invention. Further modifications and adaptations to these embodiments will be apparent to those skilled in the art and may be made without departing from the spirit of the invention or the scope of the following claims.

For instance, the sloping surface can be provided not on the sleeves but on the guide bushing template contact surface, although it is generally preferable to be able to adjust the size of the recess rather than the inlay. If the template contact surface of the guide bushing is sloped, and the sleeve template contact surface is cylindrical, then it will be the inlay that is adjusted in size rather than the recess. Additionally, both of the bushing contact surface and the sleeve contact surfaces could be conical rather than one of them being cylindrical, although there are manufacturing cost and other benefits associated with making one conical and the other cylindrical.

Other ejector structures can be used than those illustrated in the drawings. Generally, an ejector structure needs to apply force on the sleeve 38, 40, 42 or 44 to cause it to move down (in the orientation of components shown in the figures) and off of guidebushing 12, thereby disengaging the O-ring 46 or other structure used to secure the sleeves 38, 40, 42 and 44 to the guidebushing 12.

Similarly, other arrangements than the O-ring 46 and recess 48 could be used to secure sleeves 38, 40, 42 and 44 to guidebushing 12.

A variety of materials may be used for the components of the guidebushing assembly of this invention, including metals and plastic materials. One attractive and functionally appropriate material for most of the components is brass. As noted above, plastic is an appropriate material for the ejector ring 62.

What is claimed is:

1. A guide assembly for use with a template and an electric router having a base, the assembly comprising:
   a bushing holder for securing in the router base,
   a bushing positionable in the bushing holder and having a surface for contact with the template,
   a sleeve positionable around the bushing contact surface, the sleeve having a surface for contact with the template, and
   engagement structure in each of the sleeve and bushing to removably secure the sleeve to the bushing,
   wherein at least a portion of one of the bushing contact surface or the sleeve contact surface is conical.

2. The guide assembly of claim 1, wherein the other of the bushing contact surface and the sleeve contact surface is cylindrical.

3. The guide assembly of claim 1, further comprising a plurality of bushings of differing sizes positionable in the bushing holder.

4. The guide assembly of claim 2, wherein the sleeve contact surface is conical and the bushing contact surface is cylindrical.

5. The guide assembly of claim 1, further comprising a resilient ring positioned in an annular groove inside the sleeve and structure on the bushing to receive the resilient ring so that the sleeve will be retained on the bushing.

6. The guide assembly of claim 5, wherein the resilient ring is an O-ring and the bushing structure is an annular recess.

7. The guide assembly of claim 1, wherein the bushing is positionable in the bushing holder by engagement between an internal thread in the holder and an external thread on the bushing.

8. The guide assembly of claim 7, wherein the position of the bushing is adjustable relative to the holder by rotating the bushing relative to the holder while the internal and external threads are engaged.

9. The guide assembly of claim 1, further comprising an ejector structure retained within the bushing for use in facilitating removal of the sleeve from the bushing.

10. The guide assembly of claim 1, further comprising an ejector ring retained within the bushing for use in facilitating removal of the sleeve from the bushing.

11. The guide assembly of claim 10, wherein the ejector ring further comprises a plurality of legs for positioning within holes in the bushing to contact the sleeve.

12. The guide assembly of claim 11, wherein the bushing further comprises structure for engagement by a tool to facilitate rotation of the bushing within the holder.

13. The guide assembly of claim 12, wherein the structure for engagement comprises a plurality of holes in the bushing.

14. The guide assembly of claim 1, wherein the holder further comprises a flange for contact with one of the top or bottom of the router base and an external thread, and a locking nut for engaging the external thread and contact with the other of the top or bottom of the router base.

15. The guide assembly of claim 1, wherein the sleeve further comprises a structure on the sleeve to facilitate grasping the sleeve to remove it from the bushing.

16. The guide assembly of claim 1, wherein the sleeve further comprises a groove on the sleeve proximate an end of the sleeve to facilitate grasping the sleeve to remove it from the bushing.

17. A guide assembly for use with a template and an electric router having a base, the assembly comprising:
   a bushing holder for securing in the router base, the holder having an internal thread,
   a bushing locatable in the bushing holder by engagement between an external thread on the bushing and the bushing holder internal thread and repositionable within the holder by rotation of the bushing relative to the holder, the bushing comprising a cylindrical surface,
   a plurality of sleeves alternatively positionable on the bushing, each sleeve comprising a conical template contact surface, and
   at least one O-ring for engagement between the bushing and each of the sleeves alternatively to secure each sleeve to the bushing.

18. The guide assembly of claim 17, further comprising an ejector retained within the bushing for facilitating removal of one of the sleeves from the bushing.

19. A method of shaping an inlay and a recess in a workpiece to receive the inlay by reference to a template, comprising:
   securing a bushing to an electric router,
   cutting an inlay with a cutter positioned within the bushing while contacting the template with the bushing,
   securing an externally tapered sleeve around the bushing,
   cutting a recess with the cutter and forming a shape of the recess while contacting the template with the sleeve, and
   enlarging the recess by adjusting the position of the sleeve and re-cutting the recess while contacting the template with the sleeve.

20. A method of shaping an inlay and a recess in a workpiece to receive the inlay by reference to a template, comprising:

securing a bushing to an electric router, cutting an inlay with a cutter positioned within the bushing while contacting the template with the bushing, securing an externally tapered sleeve around the bushing, and adjusting the position of the sleeve in order to control the size of a recess produced while contacting the template with the tapered sleeve.

* * * * *